United States Patent [19]

Palmer

[11] 3,758,083

[45] Sept. 11, 1973

[54] WAVE-POWERED AERATOR

[76] Inventor: William E. Palmer, 5237 Fairmount, Downers Grove, Ill.

[22] Filed: Dec. 30, 1971

[21] Appl. No.: 214,035

[52] U.S. Cl............................ 261/25, 61/1 R, 61/6, 61/21, 210/136, 210/242, 261/30, 261/120, 417/331
[51] Int. Cl............................................... E02b 3/06
[58] Field of Search........................ 261/25, 30, 120; 61/1 R, 6, 21; 417/100, 232, 331; 210/170, 198–199, 220–221, 136, 242

[56] References Cited
UNITED STATES PATENTS

| | | | |
|---|---|---|---|
| 3,704,008 | 11/1972 | Ziegler.................................. | 261/25 |
| 3,365,178 | 1/1968 | Bood..................................... | 261/25 |
| 3,489,396 | 1/1970 | D'Aragon ............................. | 261/25 |
| 3,318,098 | 5/1967 | Hoddinott et al..................... | 61/6 X |
| 3,109,288 | 11/1963 | Gross.................................... | 61/6 X |

Primary Examiner—Frank W. Lutter
Assistant Examiner—Vincent Gifford
Attorney—James J. Hill

[57] ABSTRACT

A system is disclosed for taking atmospheric air and forcing it to the bottom of a large body of water, such as a lake, using only the energy available in waves. A number of flexible chambers and rigid chambers are alternately interconnected to form a string extending down into the lake. A rigid chamber communicates with the atmosphere above the lake, and adjacent chambers are connected through a check valve which opens only when pressure in an upper chamber is greater than the pressure in a lower chamber. Pressure differentials in the water caused by waves forces the air into successively lower chambers. Air is ultimately discharged from the lowermost chamber.

4 Claims, 2 Drawing Figures

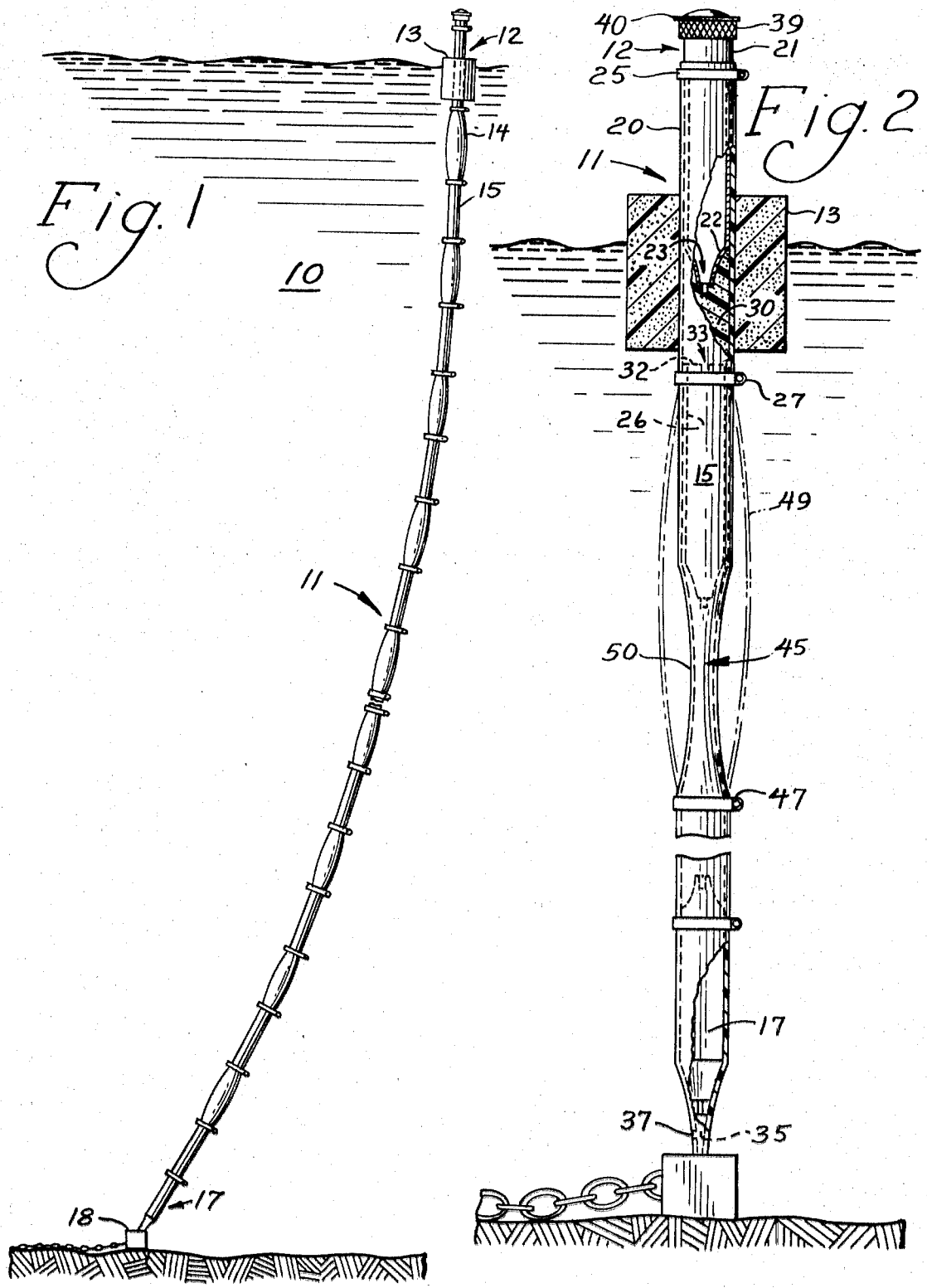

WAVE-POWERED AERATOR

BACKGROUND OF THE INVENTION

1. Field of the Invention

The present invention relates to a system for aerating a lake or other large body of water; and more particularly, it is directed to taking atmospheric air and forcing it downwardly to a depth beneath the surface of the lake and releasing it.

2. Known Systems

There have been many attempts to increase the oxygen content of large bodies of water. In the early attempts, air was pumped with mechanical means and released at varying depths beneath the surface of the water. Other early attempts sought to spray the surface water into the air and thereby dissolve oxygen from the air. However, in the latter case, much of the energy required went into friction losses in the pump and piping and into raising the water above the surface. These elementary attempts to oxygenate water have been found ineffective, particularly in larger bodies of water, such as lakes because the water in these larger bodies is stratified.

More recent attempts have achieved a greater success in the aeration of larger bodies of water by attempting to mix the water to break up the stratification and bring the oxygen-depleted layers of water to the surface for exposure to the air. Mechanical mixing of stratified water in larger bodies requires enormous amounts of energy to move the water, and are therefore thought to be infeasible on a commercial scale. Success, however, has been achieved by releasing compressed air at low depths within the water. The compressed air is not primarily intended to be dissolved in the water, but mainly to create upward currents and lift the lower layers to the surface where they can absorb oxygen from the atmosphere. A survey of the development of this art was published in an article by Thackson, et al., "Supplemental Reaeration of Lakes and Reservoirs" in the American Water Works Association Journal, October, 1966, pps. 1317-1324.

One well-known device for releasing the air in large quantities at the bottom of a lake or reservoir is described in U. S. Pat. No. 3,148,509 of Laurie, issued Sept. 15, 1964.

SUMMARY

The present invention includes a long train or string of air chambers connected to each other by means of check valves. The chambers alternate between rigid and flexible or compressible chambers. The uppermost chamber is rigid, and it communicates with the atmosphere above the surface of the body of water being aerated. The chain extends downwardly beneath the surface of the water to an extended depth.

Pressure differentials in the water caused by waves force the air into successively lower chambers. When the pressure in the flexible chamber becomes less than the pressure in the two adjacent rigid chambers, the flexible chamber will expand and draw air from the upper chamber. When the pressure in one of the flexible chambers is greater than that in the two adjacent rigid chambers, the flexible chamber collapses and forces air through a check valve into the lower of the two adjacent rigid chambers.

Thus, the present invention continuously draws air from the surface above a lake and, supplied with energy solely from the waves in the lake, forces the air downwardly to the bottom of the lake where it is released. Not only does the invention add to the dissolved oxygen and nitrogen content in the lake to help combat pollution, but it does so at the bottom of the lake, where it is most needed. Due to the increased water pressure at the bottom of the lake, the air will more readily dissolve when released.

Further, the air release at the bottom of the lake is formed in large "bubbles" in a preferred embodiment, and these bubbles pass up through the entire depth to reach the surface, thereby breaking up the stratification of the lake while, at the same time, providing an extended period of time in which the compressed air is in contact with the sub-surface waters.

The system is not connected to shore, rather it is anchored at the bottom out in the center of the lake, and the top of the string of chambers is free-floating, so that it may be positioned where the wave action is the greatest or where pollution is the worst. By using energy provided by the waves only, a great advantage in the saving of power is also achieved. Further, by diminishing the energy of the waves, protection is afforded to the beach much in the nature of a breakwater.

During winter, if ice forms on a lake, wave action is greatly reduced. However, there is still some fluctuation of pressure and horizontal water flow, in some lakes, so that oxygen can still be supplied to prevent "fish kill," a phenomenon that occurs when snow covers the ice on a lake, shutting off sunlight, which stops the action of certain underwater plant life that converts carbon dioxide into carbon and oxygen.

Other features and advantages of the present invention will be apparent to persons skilled in the art from the following detailed description of a preferred embodiment accompanied by the attached drawing wherein identical reference numerals will refer to like parts in the various views.

THE DRAWING

FIG. 1 is an elevational view of a system incorporating the present invention; and FIG. 2 is a detailed showing of alternate rigid and flexible chambers.

DETAILED DESCRIPTION

Turning then to the drawing, reference numeral 10 generally designates a lake or other body of water desired to be aerated and in which waves naturally occur. Located in the body of water is a string generally designated 11 of chambers. At the top of the string 11 there is a rigid chamber 12 communicating with the atmosphere above the surface of the lake 10, and held there by means of a float 13 which may be plastic foam.

Connected to the bottom of the rigid chamber 12 there is a flexible chamber 14, and connected to the bottom of the flexible chamber 14 is a second rigid chamber 15. Thereafter, alternate chambers include a flexible chamber followed by a rigid chamber down to the bottom of the lake where a rigid chamber 17 is held by means of an anchor 18.

Turning to FIG. 2, the string 11 can be seen in greater detail as comprising an outer elongated cylindrical flexible sleeve 20 which may be provided in a continuous sleeve from top to bottom of the chambers. Fitted within the top of the sleeve 20 is a cylindrical member 21 which forms the side wall of the upper chamber 12.

The cylindrical side wall 21 has a lower tapered or frontal portion 22, at the bottom of which is provided a check valve 23. The check valve 23 is arranged to permit air to flow from within the rigid chamber 12 to the flexible chamber beneath, but not in the other direction. Any suitable check valve may be employed provided it is sensitive to relatively low pressure differentials of the order of 3 in. of water. Preferably, it is desirable to use a valve in which the moving member includes a flexible O ring of the type well known in the art as this type of valve is less likely to be held open by a foreign particle. However, the check valve 23 (as well as subsequent check valves) may include a flat disc held against the underside of the opening by a coil spring, so that air pressure from above will open the valve and compress the spring, while air pressure from below will only cause a tighter closing of the valve. This latter type of valve are similar to those used in the fuel pumps of automobiles.

The cylindrical wall 21 is held rigidly to the sleeve 20 by means of a hose clamp 25. A similar cylindrical wall 26 is secured to the sleeve 20 by means of a clamp 27 at a position beneath the check valve 23, and the space within the sleeve 20 between the first rigid chamber 12 and the second rigid chamber 15 comprises the first flexible chamber 14. The first of the flexible chambers 14 is filled with an open-celled flexible, resilient plastic foam, such as polyurethane as at 30 to bias the portion of the sleeve 20 forming this flexible chamber in an opened state. That is, an increased pressure will collapse the foam 30 to cause the flexible chamber 14 to assume a contracted position, and then a subsequent reduction in pressure will release the compressed foam 30 which, in turn, will expand the chamber 14 and draw air through the check valve 23 from the upper rigid chamber 12.

The upper portion of the second right chamber 15 differs from the first rigid chamber 12 in that it includes an upper flat wall 32, the center of which is provided with a check valve 33 similarly to the previously-described check valve 23.

Successive ones of the rigid and flexible chambers are similar to the chambers 15 and 14 respectively except that the lowermost rigid chamber communicates with a lower space 35 which is provided with apertures as at 37 for releasing the air. Alternatively, the lower portion of the lowest chamber 17 may be connected to an air bubble gun, such as the one disclosed in the above-identified patent.

The upper, open end of the cylindrical side wall 21 of the first rigid chamber 12 may be provided with a screen 39 for preventing large foreign objects from entering into the string of chambers, and a cap 40 may be provided to cover the open end to prevent the entry of rain, etc.

In operation, the interior of the first rigid chamber 12 communicates with the atmosphere above the lake, and it is held in a generally upright position by means of the float 13. The first flexible chamber 14 is biased in an expanded position. A positive pressure differential will collapse the foam 30, and when this differential abates, the foam 30 will expand (and hence, the chamber 14) to draw air from the first rigid chamber 12. Subsequently, the next positive pressure differential experienced by the flexible chamber 14 will cause air from that chamber to enter through the check valve 33 into the second rigid chamber 15. When this pressure abates, air will again be drawn from the first rigid chamber into the first flexible chamber 14. In subsequent chambers, for example the combination of rigid chamber 15 and its lower flexible chamber (designated by reference numeral 45), it will be observed that the rigid chamber 15 is actually suspended within the flexible chamber 45 which extends from the upper hose clamp 27 to a lower hose clamp 47. That is, in its expanded state, the chamber 45 assumes the position of the outer chain line 49 whereas in its contracted position, it is collapsed to the position shown at 50.

It will thus be appreciated that no external energy need be applied to cause a continuous down flux of fresh air which is released at the bottom of the lake and which is caused to dissolve there due to the increase pressure. Further, as the air bubbles up (which effect may be enhanced by means of an air bubble gun as already explained) the stratification of the water layers in the lake is broken up.

In one embodiment, the overall string is 55 feet long, and the inside of the outer sheating is 4 in. It is intended to operate in 30 feet of water, and it consists of a flexible hose, similar to a fire hose, made of woven nylon impregnated with a flexible vinyl plastic. It is a wall thickness of 1/16 in. and it combines extreme flexibility and lightness with strength and abrasion resistance and flexure resistance. The rigid chambers include sections of plastic pipe having an outside diameter of about 4 in. with a thickness of about ¼ in. They are 18 in. long and have a cap at each end to form the rigid chamber. Each cap has a 1 in. hole into which is inserted a check valve. The top end of the hose is connected to a 6 foot long rigid pipe contained in the foam plastic ring to give it buoyancy. It is designed to extend about 4 feet above the surface of the water.

Having thus described in detail a preferred embodiment of my invention, persons skilled in the art will be able to modify certain of the structure which has been shown to substitute equivalent elements for those which have been disclosed; and it is, therefore, intended that all such modifications and substitutions be covered as they are embraced within the spirit and scope of the appended claims.

I claim:

1. A system for aerating a lake including a plurality of interconnected rigid and flexible chambers disposed in a string in alternate fashion, the uppermost chamber being a rigid chamber and communicating with the atmosphere above the lake, flotation means for holding the string in a generally upright position with the open upper mouth of the first rigid chamber held above the surface of the lake; unidirectional air flow means interconnecting adjacent chambers for permitting the downflow of air while preventing the upflow of air; and resilient means for urging the first flexible chamber in expanded condition; whereby a positive pressure differential will cause a flexible chamber to contract thereby expelling air into a lower rigid chamber and a negative pressure differential will cause a flexible chamber to expand thereby drawing air in from an upper rigid chamber.

2. The system of claim 1 further comprising means for anchoring the lowermost chamber of said string to the bottom of the lake.

3. The system of claim 1 wherein said string includes a continuous flexible outer sheathing and each rigid chamber includes a cylindrical wall member spaced from adjacent ones of said rigid chambers and held to said outer sheathing by means of clamp means.

4. The system of claim 1 further comprising rain shield means for preventing rain from entering into the open mouth of the uppermost rigid chamber while permitting air to enter therein.

* * * * *